No. 745,610. PATENTED DEC. 1, 1903.
J. E. HICKEY.
HOEING MACHINE.
APPLICATION FILED JULY 28, 1903.
NO MODEL.

WITNESSES:
J. J. Laass
W. H. Neien Jr.

INVENTOR
John E. Hickey
By E. Laass
ATTORNEY.

No. 745,610.                                     Patented December 1, 1903.

UNITED STATES PATENT OFFICE.

JOHN E. HICKEY, OF LAMSON, NEW YORK.

HOEING-MACHINE.

SPECIFICATION forming part of Letters Patent No. 745,610, dated December 1, 1903.

Application filed July 28, 1903. Serial No. 167,259. (No model.)

*To all whom it may concern:*

Be it known that I, JOHN E. HICKEY, a citizen of the United States, and a resident of Lamson, in the county of Onondaga, in the State of New York, have invented new and useful Improvements in Hoeing-Machines, of which the following, taken in connection with the accompanying drawings, is a full, clear, and exact description.

This invention is designed chiefly for hoeing plants while young and only grown a short height from the ground.

The object of the invention is to provide a machine which shall be simple and inexpensive in construction and light, convenient, and efficient in its operation; and to that end the invention consists in the novel construction of the hoeing-machine hereinafter described, and set forth in the claims.

Figure 1:
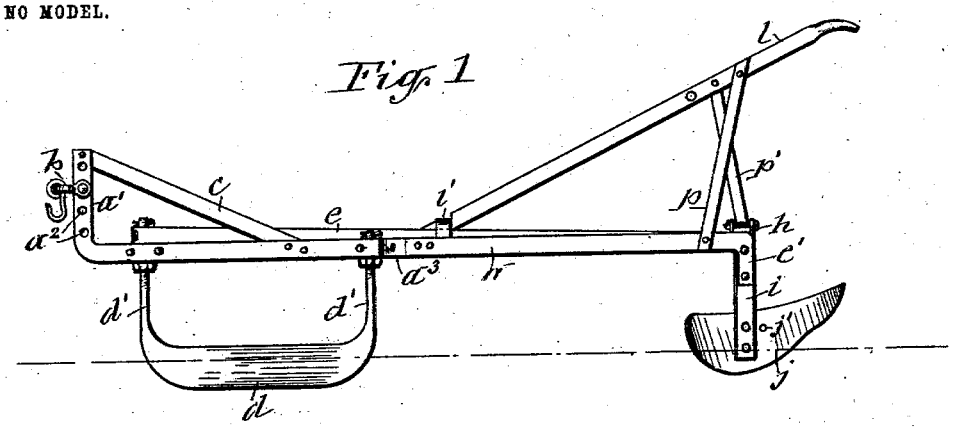
Figure 2:
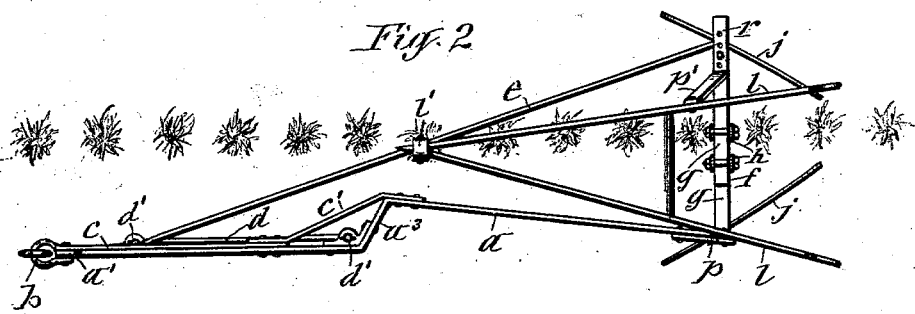
Figure 3:
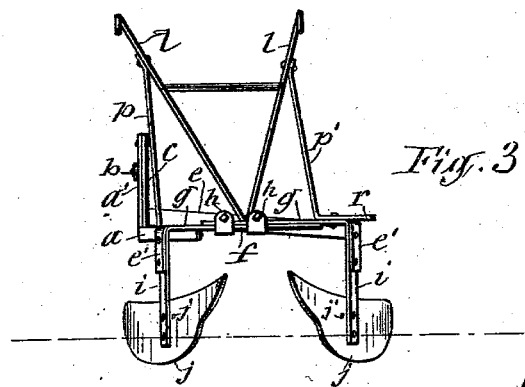

In the annexed drawings, Figure 1 is a side view of a hoeing-machine embodying my invention. Fig. 2 is a plan view of the same, and Fig. 3 is a rear end view.

Similar letters of reference indicate corresponding parts.

$a$ represents the main draft-bar, the front end of which is formed with an upward extension $a'$, provided with a plurality of bolt-holes $a^2$ $a^2$ for receiving the attaching-bolt of the clevis or suitable shackle $b$, to which the horse or draft-animal is to be hitched. The plurality of bolt-holes $a^2$ allows the hitching-shackle $b$ to be adjusted to a proper elevation above the bar $a$ to suit the height of the draft-animal. The extension $a'$ is braced by a bar $c$, extending rearward from the upper end of said extension to the bar $a$ and securely fastened to said parts.

A portion of the length of the bar $a$, preferably the central portion thereof, is formed with a lateral deflection $a^3$, which is stiffened by means of a brace $c'$, placed lengthwise on the side of the bar $a$ at said deflection and riveted to the bar. In front of the said deflection and disposed lengthwise under the draft-bar $a$ is a prolonged guide-blade $d$, formed at its ends with attaching-shanks $d'$ $d'$, which by means of suitable clips are fastened to the draft-bar and are of proper lengths to allow the said guide-blade to enter the ground, so as to steady and guide the front portion of the machine in its movement. The aforesaid deflection $a^3$ serves to brace the bar $a$ laterally, so as to resist the strain exerted on the guide-blade by the soil pressing on the side of said blade.

To the front end portion of the main draft-bar $a$, preferably to the upwardly-projecting end of the front attaching-shank $d'$, is pivotally connected the front end of the side draft-bar $e$, which extends divergently rearward from the bar $a$. The rear end of each of these bars is formed with a downward extension $e'$, which is attached to one of the depending arms formed on the transverse spreader $f$, which sustains the rear ends of the two bars $a$ and $e$ the desired distance apart. I preferably render the said spreader adjustable to hold the bars $a$ and $e$ a greater or less distance apart. For this purpose I form the spreader of two transverse bars $g$ $g$, which overlap each other at their inner end portions and are adjustably clamped together by means of suitable clips $h$ $h$, embracing said portions. Each of the spreader-bars $g$ $g$ is formed at its outer end with a depending arm $i$, to the lower end of which is connected one of the pair of hoeing-blades $j$, which are elongated and are disposed with their rear ends convergingly toward each other to scrape the soil toward the row of plants simultaneously at opposite sides thereof.

To allow the hoeing-blades to be adjusted longitudinally in their inclination, I preferably provide each of said blades with two or more holes $j'$ for the reception of one of the bolts by which the blade is attached to the spreader-arm $i$, the companion attaching-bolt serving as a pivot upon which the blade is turned in its adjustment.

$l$ $l$ represent the handles, which are jointly connected at their front ends to a shoe or sleeve $l'$, secured to one of the draft-bars, preferably to the side bar $e$. The rear ends of the handles are attached to the upper ends of props $p$ and $p'$, one of which is attached at its lower end to the main draft-bar $a$. The other prop, $p'$, is formed with a laterally-extended foot $r$, which rides upon the spreader $f$ and is adjustably secured thereto in any suitable manner, preferably by means of a bolt passing through the spreader-bar $g$ and through one of a plurality of holes in the foot $r$. The other prop, $p$, is sufficiently flexible to allow the prop $p'$ to be shifted laterally, so as to carry the rear ends of the handles in a convenient position to allow the operator to walk in the path of the draft-animal.

What I claim as my invention is—

1. The combination of the main draft-bar deflected laterally intermediate its ends, a guide-blade depending from said bar in front of the deflection thereof, a side bar pivoted to the front end portion of the main bar, a spreader adjustably connecting the rear ends of said bars, hoeing-blades depending from the rear ends of the bars, and handles connected to said bars.

2. The combination of the main draft-bar deflected laterally intermediate its ends, a prolonged guide-blade disposed lengthwise under the front end portion of said bar, a side bar pivoted to the main bar, a spreader adjustably connecting the rear ends of said bars, depending arms attached to said spreader, hoeing-blades attached to said arms, and handles attached to the bars.

3. The combination of the main draft-bar deflected laterally intermediate its ends, a prolonged guide-blade disposed lengthwise under the said bar in front of the deflection thereof and provided at its ends with attaching-shanks secured to the draft-bar, a brace extending across the deflection of the bar and fastened thereto, a side bar pivoted at its front end to one of the aforesaid shanks, a spreader adjustably connecting the rear ends of the bars, depending arms fixed to said spreader, hoeing-blades attached to said arms, handles connected at their front ends to the side bar, and provided at their rear ends with laterally-shiftable supports as set forth and shown.

4. The combination of the main draft-bar formed at its front end with an upward extension and with a lateral deflection intermediate its ends, a hitching-shackle connected adjustably to said extension, a prolonged guide-blade depending from said bar in front of the lateral deflection, a brace extending across said deflection and fastened to the bar, a side bar pivoted at its front end on the main bar, a spreader composed of overlapping transverse bars clamped adjustably together and each formed at its outer end with a depending arm, hoeing-blades attached to said arms adjustably so as to present different angles of inclination in longitudinal direction, handles pivoted jointly at their front ends to the side bar, and supported at their rear ends on laterally-shiftable props as set forth and shown.

JOHN E. HICKEY.

Witnesses:
J. J. LAASS,
W. H. MEIER, Jr.